Nov. 7, 1967 L. A. COCHRAN ET AL 3,351,709
COLOR DEMODULATORS
Filed April 26, 1965
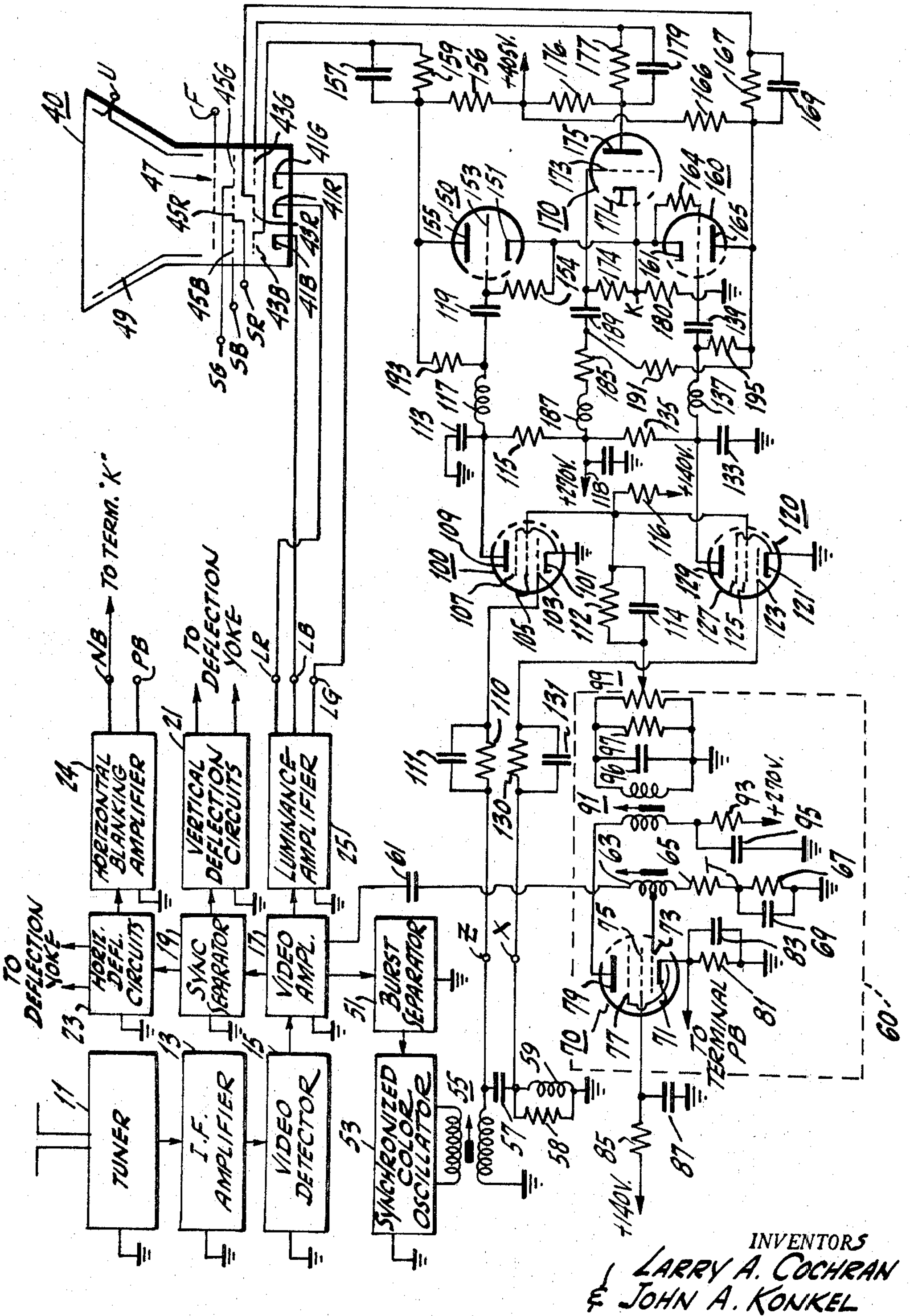
INVENTORS
LARRY A. COCHRAN
& JOHN A. KONKEL
BY William H. Meagher
Attorney 3,351,709
Patented Nov. 7, 1967

3,351,709

COLOR DEMODULATORS

Larry A. Cochran and John A. Konkel, Indianapolis, Ind., assignors to Radio Corporation of America, a corporation of Delaware Filed Apr. 26, 1965, Ser. No. 450,706
4 Claims. (Cl. 178—5.4)

ABSTRACT OF THE DISCLOSURE

Color demodulator employs pentode with received chrominance signal applied to screen grid, operated at low D.C. bias, and with local reference oscillations applied to control grid. Self-biasing network associated with control grid permits tube conduction only during positive peaks of reference oscillations. Mode of operation permits use of pentode section of inexpensive pentode-triode tube (where pentode suppressor is internally shorted to cathode) as demodulator, facilitating convenient receiver arrangement wherein all color signal processing functions are effected in sections of tubes of the same type.

The present invention relates generally to synchronous demodulators, and, particularly, to synchronous demodulator arrangements suitable for performing the color subcarrier demodulation functions in a color television receiver.

In a copending application of Gordon E. Kelly, Ser. No. 450,669, entitled, "Synchronous Demodulators," and filed concurrently herewith on Apr. 26, 1965, a color demodulator arrangement is disclosed wherein relatively inexpensive pentode tubes are employed for color demodulator purposes, with the screen grid electrode of each pentode device supplied with an abnormally low operating potential and utilized as a control electrode in achieving the desired heterodyning function. Pursuant to the principles of the invention disclosed in said Kelly application, the control grid (i.e., first grid) and the screen grid (i.e., second grid) of a relatively inexpensive power pentode (having its suppressor grid, i.e., third grid, shorted to the tube cathode) may adequately serve as the respective modulating electrodes for color demodulation purposes.

In the circuitry shown in the aforesaid Kelly application, the chrominance signal sought to be demodulated is applied to the pentode control grid, which is positively biased relative to the pentode cathode, whereby grid current is continually drawn. Unmodulated subcarrier frequency oscillations from the receiver's local color oscillator are applied to the pentode screen grid, which is supplied with an abnormally low unidirectional operating potential.

The present invention is directed to a modification of the aforesaid circuit providing a number of practical operating advantages relating to such factors as permissible drive magnitude, output linearity and bias compensation.

In accordance with an embodiment of the present invention, the color demodulator pentodes are subject to chrominance signal drive of their screen grids, with each screen grid, as in the above-described circuit, being supplied with an abnormally low unidirectional operating potential. The local color oscillations are applied, in appropriate phases, to the control grids of the demodulator pentodes, in accordance with a self-biasing arrangement, whereby grid current is drawn only at the time of the positive peaks of the applied oscillations.

In operation, the arrangement contemplated by the present invention permits a greater magnitude of chrominance signal drive (before introduction of nonlinearities in the output) than in the case of chrominance signal drive of the pentode control grid. The respective demodulators set their own bias levels from the grid current drawn during the respective positive swings of the appropriately phased local oscillations; automatic compensation for variations in tube characteristics and for differences in local oscillation drive levels is thereby obtained. Loading of the local color oscillator is minimized. Limiting on the negative swings of the local oscillations reduces response to undesired amplitude modulations of the local oscillations that can occur due to spurious crystal vibrations, where the local color oscillator is crystal controlled.

A primary object of the present invention is to provide a novel and improved color demodulator arrangement for a color television receiver .

A further object of the present invention is to provide a color television receiver subcarrier demodulator circuit providing quality demodulator performance while using relatively inexpensive pentode devices.

Other objects and advantages of the present invention will be readily recognized by those skilled in the art after a reading of the following detailed description, and an inspection of the accompanying drawing, wherein the sole figure illustrates a color television receiver, shown partially in block diagram form, and incorporating a color demodulator arrangement, shown in schematic detail, in accordance with a particular embodiment of the present invention.

Referring to the drawing, a color television receiver is therein illustrated of a general form corresponding, for example, to the RCA CTC–17 color television receiver chassis (set forth in schematic detail in the RCA Service Data pamphlet designated 1964 No. T12). The illustrated receiver includes an RF tuner 11, which serves to selectively convert a broadcast RF signal to intermediate frequencies for amplification in an IF amplifier 13; the output of IF amplifier 13 is supplied to a video detector 15, which recovers from the modulated picture carrier a composite video signal. This composite video signal is amplified in a video amplifier 17, which provides outputs for application to a variety of signal utilization channels in the receiver.

One output of the video amplifier is supplied to a deflection sync separator 19, which separates the deflection synchronizing pulses from the remainder of the composite video signal, and supplies these synchronizing pulses to respective vertical and horizontal deflection circuits, 21 and 23, respectively. These deflection circuits generate properly synchronized line and field deflection waveforms for application to a deflection yoke (not illustrated), which is associated, for usual raster development purposes, with a color image reproducing device.

Illustratively, the color image reproducing device is constituted by a tri-gun, shadow mask color kinescope 40; the operating electrodes of the color kinescope 40 include: a trio of cathodes 41R, 41B and 41G; a trio of control grids 43R, 43B, and 43G; a trio of screen grid electrodes 45R, 45B and 45G; a commonly energized focussing electrode structure 47; and a final accelerating or ultor electrode 49. A suitably stabilized high voltage is supplied to the ultor electrode via its energizing terminal U. While a lesser unidirectional potential (preferably adjustable) is supplied to the focus electrode energizing terminal U, while a lesser unidirectional potential (preferably adjustable) is supplied to the focus electrode energizing terminal F. Individually adjustable unidirectional voltages are supplied to the screen grid electrodes 45R, 45B and 45G via respective screen grid terminals $S_R$, $S_B$ and $S_G$.

Control of the brightness of the image reproduced by kinescope 40 is effected by the luminance signal component of the composite video signal, which is amplified in a suitably wide band luminance amplifier 25 (responding to an output of video amplifier 17). The luminance amplifier 25 develops luminance signal outputs at respective output terminals LR, LB and LG for direct application to the respective kinescope cathods 41R, 41B and 41G. Desirably, the luminance amplifier 25 may include means for adjusting the relative amplitudes of the luminance signal outputs appearing at the respective output terminals, for color balance purposes.

To effect the requisite synchronous demodulation of the modulated color subcarrier which constitutes the chrominance signal component of the received composite video signal, it is necessary to provide a local source of oscillations of the nominal color subcarrier frequency, which source is maintained in suitable frequency and phase synchronism. In the illustrated receiver the synchronized color oscillator 53 serves as the local oscillation source. The color synchronizing component of the received composite video signal, which component takes the form of a burst of subcarrier frequency oscillations of reference phase, is separated from the remainder of the composite video signal by a burst separator 51 responding to an output of video amplifier 17. Time selection as well as frequency selection is employed in the burst separation achievement, the burst separator responding to gating pulses derived (via a path not illustrated for drawing simplicity) from the horizontal deflection circuits 23.

The details of the synchronized color oscillator 53, to which the output of burst separator 51 is applied, are not illustrated in the drawing. In the aforementioned CTC–17 color television receiver, the color oscillator comprises a crystal controlled oscillator, synchronized by the received burst through the use of an automatic phase and frequency control circuit. While such an APFC technique may be employed in the synchronization of oscillator 53, a simpler alternative resides in the use of injection locking techniques, such as were employed, for example, in the RCA CTC–5 color television receiver described in the RCA Service Data pamphlet designated 1956 No. T4.

The unmodulated subcarrier frequency output of oscillator 53 is developed across the primary winding of an output transformer 55, shown schematically in the drawing. The secondary winding of the oscillator output transformer 55 is shunted by the series combination of a capacitor 57 and an inductor 59, serving a phase splitting function, whereby respective differently phased versions of the oscillator output are developed at the respective terminals Z and X (terminal Z being connected to the junction of the capacitor 57 and secondary winding 55, and terminal X being connected to the junction of capacitor 57 and inductor 59). Utilization of these differently phased outputs in color demodulator circuitry will be described subsequently.

Also responding to an output of video amplifier 17 is a chrominance amplifier 60, shown in schematic detail in the drawing. The chrominance amplifier 60 comprises a bandpass amplifier stage that selectively amplifies color sideband components falling in an appropriate band of frequencies surrounding the color subcarrier frequency. A coupling capacitor 61 links video amplifier 17 to a suitably tuned input transformer 63. The input transformer is connected in autotransformer form, with one end terminal connected to coupling capacitor 61, the other end terminal connected to a point of reference potential (e.g., chassis ground) via a resistor 65 in series with a resistor 67 (the latter resistor being shunted by a capacitor 69), and an intermediate terminal being directly connected to the control grid 73 of a pentode tube 70. Terminal T, at the junction of resistors 65 and 67, provides a suitable point for application of a color kill voltage (from suitable color killer circuitry, not illustrated) to disable chrominance amplifier 60 when monochrome signals are being received. The cathode 71 of pentode 70 is returned to ground via a cathode resistor 81, shunted by a capacitor 83. Periodically recurring positive blanking pulses, occurring in time coincidence with the recurring burst intervals of the received composite video signal are applied to cathode 71 from a positive blanking pulse output terminal PB of a horizontal blanking amplifier 24, responding to an output of the horizontal deflection circuits 23. The blanking amplifier 34 may take the form exemplified in the aforementioned CTC–17 color television receiver, and thus comprise a triode responding to positive flyback pulses applied to its control grid, and sharing resistor 81 with tube 70 as its cathode resistor. The effect of the blanking pulse connection is to cut off pentode 70 during the appearances of the synchronizing burst in its control grid 73, whereby the chrominance amplifier output during each successive horizontal flyback interval is devoid of signal information, and is instead a substantially constant level throughout the flyback interval.

The screen grid 75 of pentode 70 is connected to a suitable source of positive operating potential via a dropping resistor 85; the screen grid 75 is bypassed to ground for signal frequencies by a suitably valued bypass capacitor 87. The suppressor grid 77 of pentrode 70 is, illustratively, internally shorted to cathode 71. The plate 79 of pentode 70 is connected via the primary winding of a tuned output transformer 91, in series with a dropping resistor 93, to a source of positive anode potential; the dropping resistor 93 is bypassed to ground for signal frequencies by a suitably valued bypass capacitor 95. The secondary winding of the tuned output transformer 91 is shunted by a fixed tuning capacitor 96, in parallel with the Q-modifying resistor 97. Also shunting the secondary winding of transformer 91 is the resistive element of potentiometer 99, which serves a manual chroma control purpose, adjusting the magnitude of the chrominance component delivered to the subsequent demodulator stages to control the saturation of the colors to be reproduced. There is thus available at the movable tap of potentiometer 99 a chrominance component input for the receiver's color demodulators of a manually adjustable magnitude.

It is now in order to describe the circuit connections of the novel color demodulator arrangements of the illustrated embodiment of the present invention. A pair of demodulator tubes 100 and 120 are employed, each comprising a pentode section. The respective suppressor grids 107 and 127 of the pentodes 100 and 120 are internally shorted to the respectively associated cathodes 101 and 121, which are each directly connected to ground. The respective screen grids 105 and 125 are directly connected together, and via a common screen load resistor 116 to a source of positive operating potential. The chrominance signal component available at the tap of potentiometer 99 is applied to the jointly connected screen grids 105 and 125 via the parallel combination of a resistor 112 and a capacitor 114.

The control grid 103 of pentode 100 is connected via a self-biasing network comprising the parallel combination of resistor 110 and capacitor 111 to the local color oscillator phase splitter output terminal Z. The control grid 123 of pentode 120 is connected to the phase splitter output terminal X via a similar self-biasing network comprising the parallel combination of resistor 130 and capacitor 131. The plate 109 of pentode 100 is connected to a source of positive anode potential via a load resistor 115, while the plate 129 of pentode 120 is connected to the same anode potential source via a load resistor 135. Bypass capacitor 118 is connected between the common anode potential supply point and chassis ground.

Before proceeding to a description of the circuitry for utilizing the output signals developed at the respective demodulator plate electrodes 109 and 129, a brief description of the mode of operation of the demodulator stages is appropriate. The local color oscillations applied from terminal Z to control 105 cause, during their positive swings, the drawing of grid current in pentode 100. After the initiation of operation, this recurrent grid current builds up a negative charge on capacitor 111 in accordance with familiar self-biasing principles, such that current production in pentrode 100 is limited to relatively brief, the recurrent intervals corresponding to the positive peaks of the Z-phased oscillations. A similar action occurs in relation to the control grid circuit of tube 120, with a negative bias being built up across capacitor 131 that permits conduction in tube 120 only during brief intervals corresponding to the positive peaks of the X-phased local color oscillations.

The value of the common screen resistor 116 is chosen with relation to the supply potential value so as to establish a unidirectional operating potential at the respective screen grids 105 and 125 which is quite low compared to the screen grid operating potential rating for the pentode tubes. The respective screen grid electrodes 105 and 125 are conjointly swung above or below this relatively low operating potential level in accordance with the received chrominance signal component applied from the output tap of potentiometer 99. The selected operating potential level, and the range of chrominance signal component magnitudes available at the output tap of potentiometer 99, are related in suitable manner to permit the chrominance signal component variations at the respective screen grid electrodes to significantly affect the magnitude of anode current drawn during the recurring conducting periods respectively established in each tube.

The variation of control grid potential in accordance with the Z-phased local color oscillations and the concomitant variation of screen grid potential in accordance with the received chrominance component establishes a heterodyning action in the device 100, resulting in the appearance in the anode current of the device of the usual detection products (e.g. sum, difference and input frequency components). Associated with the plate circuit of pentode 100 is a low pass filter comprising a shunt capacitor 113 and a series inductor 117, serving to effectively suppress the frequencies of the signal inputs to pentrode 100 (as well as the sum frequency product), leaving only the difference frequency product of the synchronous detection operation at the output terminal (remote from plate 109) of inductor 117 for delivery to subsequent stages. This difference frequency product comprises color information in the form of a color-difference signal, designated for present purposes as a Z signal. Operation in tube 120 is as described for tube 100; shunt capacitor 133 and series inductor 137 provide the low pass filtering action for the output circuit of tube 120, with the difference frequency product appearing at the output terminal of series inductor 137 comprising a color-difference signal, designated as an X signal for present purposes.

The circuit details of a particular matrix circuit configuration for processing the X and Z color difference signal outputs of tubes 100 and 120 have been shown in the drawing for the sake of completeness in the description of a particular embodiment of the present invention. The general principles underlying the design of the illustrated matrix circuitry (of a three-tube, common cathode impedance form), and the related choice of the X and Z demodulating phases, are set forth in U.S. Patent No. 2,830,112 issued to Dalton H. Pritchard on Apr. 8, 1958. Certain variations of these basic design principles are also relied upon, pursuant to the principles of the invention disclosed in U.S. Patent No. 3,270,126, issued on Aug. 30, 1966 and based on a copending patent application of Paul E. Crookshanks and Thornley C. Jobe, Ser. No. 265,951, filed Mar. 18, 1963, and entitled, "Color Television Receiver."

The plate outputs of demodulator tubes 100 and 120, which respectively comprise Z and X color-difference signals, are supplied to a color matrix circuit employing a trio of triodes, 150, 160 and 170; the color matrix circuit serves to suitably mix the X and Z color-difference signals in order to obtain a trio of outputs signals taking the form of R–Y, B–Y and G–Y color-difference signals. The respective cathodes, 151, 161 and 171 of triodes 150, 160 and 170, are each directly connected to a common cathode terminal K and returned therefrom to ground via a common cathode resistor 180.

The control grid 153 of tube 150 is coupled to receive the X signal output of demodulator tube 100, while the control grid 163 of matrix tube 160 is coupled to receive the Z signal output of demodulator tube 120. The X signal coupling from demodulator tube plate 109 to matrix tube control grid 153 is effected by means of the previously mentioned inductor 117 in series with a coupling capacitor 119. Resistors 154 and 164 serve as grid leak resistors for the respective triode 150 and 160, each being directly connected between the respectively associated cathode and control grid electrodes.

The control grid 173 of triode 170 is coupled to the point of positive plate potential supply for the demodulator tubes of the series combination of a capacitor 189, a resistor 185 and an inductor 187. Capacitor 189 matches the capacitance value of the respective coupling capacitors 119 and 139, and inductor 187 matches the inductance value of inductors 117 and 137. Resistor 187 effectively matches the resistance value of one of the matched demodulator load resistors 115, 135, as modified by the shunting effect of its respectively associated demodulator tube. A resistor 174, of equal resistance value to resistors 154 and 164, links cathode 171 to control grid 173 to thus serve as the grid leak resistor for tube 170. In view of the foregoing grid circuit connections and relationships, the impedance effectively presented to control grid 173 of triode 170 is equal, in all significant aspects, to the impedance effectively presented to each of the respective control grids 153 and 163.

Each of the anodes 155, 165 and 175 of the matrix tubes 150, 160 and 170 is connected to a common anode potential supply point by means of a respective anode load resistor (156, 166, 176), the three anode load resistors being of equal resistance value. A direct current conductive connection is provided between each of the anodes 155, 165 and 175 and the respectively appropriate kinescope control grid (43B, 43G and 43R) in such manner as to deliver to the latter the color-difference signal output of each matrix tube without attenuation of its DC component relative to its AC component. For kinescope protection purposes, a limiting resistor (shunted by a capacitor) is included in series in each coupling path from matrix tube anode to kinescope grid; resistor 159 (shunted by capacitor 157) serves this function in the path to the blue control grid 43B, while resistor 177 (shunted by capacitor 179) and resistor 167 (shunted by capacitor 169) serve similar purposes for the green and red control grids, 43G and 43B, respectively. Should a matrix tube fail, the drawing of substantial grid current by the associated electron gun is avoided due to the presence of the protective circuit elements; in normal operation, the protective circuit elements have substantially no effect on the color-difference signal drive of the kinescope control grids, allowing effectively 100% DC coupling from each matrix tube to the kinescope.

As previously noted, the general theory and principles of operation of the three-tube, common cathode matrix circuit described above are set forth in the above-mentioned Pritchard patent. Modification of this general theory of operation in certain aspects is provided in the circuit of the drawing by the use of resistors 191, 193 and 195.

Resistor 191 is connected between the anode 165 of matrix tube 160 and the junction between resistor 185 and coupling capacitor 189 in the grid circuit of matrix tube 170. Resistor 191 provides a cross-coupling of a portion of the R–Y output of tube 150 to the control grid 173 of the tube 170 (from which a G–Y signal is to be derived.) The use of this cross coupling of R–Y signal information enables the obtaining of a more accurate G–Y representation in the tube 170 output where practical design conditions restrict the range of selection of such circuit parameters as the X and Z demodulating angles and the common cathode impedance value.

Resistor 193 is connected between the anode 155 of matrix tube 150 and the junction between choke 117 and coupling capacitor 119 in the grid circuit of tube 150. Similarly, resistor 195 is connected between the anode 165 of tube 160 and the junction between choke 137 and coupling resistor 139 in the grid circuit of tube 160. The resistors 193 and 195 thus provide respective negative feedback paths for the matrix tubes 150 and 160. The use of such negative feedback effects a desired adjustment of the associated matrix tube gain, as well as overcoming a bandwith reduction effect that tends to flow from the use of the 100% DC coupling circuit arrangement previously discussed. That is, with the use of 100% DC coupling from matrix tube to kinescope control grid, the matrix tube load resistor plays a major role in determining the level of bias on the associated kinescope control grid; in practice, satisfaction of the kinescope bias demands may thereupon call for the use of an unusually large matrix tube load resistor, with resultant adverse effect on matrix tube output bandwith unless compensation is provided, as by the above-noted use of negative feedback.

Supplied to the cathodes of each of the matrix tubes 150, 160 and 170 is a negative-going version of the blanking pulse output of the horizontal blanking amplifier 24 (available at terminal NB thereof). The pulses delivered to terminal K are of sufficient magnitude to drive the grid-cathode diodes of each of the matrix tubes into grid current conduction during each horizontal retrace interval. This periodic conduction develops a charge on the respective grid capacitors 119, 139 and 189 which sets the operating points of the respective matrix tubes. The principles of this mode of operating point setting, and the inherent stability advantages thereof, are set forth in U.S. Patent No. 2,901,534 issued to Charles B. Oakley on Aug. 25, 1959.

The setting of the operating point of each matrix tube in the above-described manner will be readily recognized as having the effect of establishing the no-signal plate voltage value for each matrix tube. In view of the 100% DC coupling arrangement employed in driving the kinescope control grids, it accordingly follows that the setting of the matrix tube operating points directly affects the DC bias on each kinescope control grid. It should be noted that to whatever extent the use of cross-coupling resistor 191 tends to introduce a reduction in effective pulse amplitude for tube 170 (by feeding a negative pulse component from plate 165 to grid 173), this effect is matched in the circuits of tubes 150 and 160 by the pulse feedback from plate to grid via the respective feedback resistors 193 and 195. Where a master kinescope bias control is desired, it may be conveniently provided, as in the aforementioned CTC-17 receiver, by providing the blanking amplifier 24 with suitable means for controlling the amplitude of the pulses developed at terminal NB.

It may be noted that each of the pentodes 70, 100 and 120 (serving as reference oscillator, Z demodulator and X demodulator, respectively) and each of the matrix triodes 150, 160 and 170 of the illustrated embodiment have been indicated in the drawing (by partial broken-line envelope outlining) as comprising a section of a multi-section electron tube. This is illustrative of a particular working embodiment of the present invention wherein each demodulator comprises the pentode section of a relatively inexpensive pentode-triode, such as the 6GH8A type tube; the triode sections of these tubes may conveniently serve as two of the matrix triodes. The third matrix triode may be matched to the other two by using the triode section of a third 6GH8A tube therefor, with its pentode section serving as the chrominance amplifier tube 70. The foregoing illustrates the tube choice convenience afforded to a receiver designer through use of the demodulating principles of the present invention. To further illustrate the advantages flowing from such tube choice convenience afforded by use of the present invention, it may be noted that the above-illustrated use of three 6GH8A pentode-triodes to serve chrominance amplifier, demodulator and matrix tube functions may be complemented by the use of (a) an injection-locked color reference oscillator, employing a 6GH8A pentode section as the active oscillator device, in performing the function of synchronized color oscillator 53, (b) the triode section of the oscillator 6GH8A to perform the function of blanking amplifier 24, (c) the pentode section of another 6GH8A tube to perform the function of burst separator 51, and (d) the triode section of the separator 6GH8A to perform the previously discussed (but not illustrated) color killer function. The result of the foregoing is to achieve all of the chrominance signal processing functions using only five tube envelopes, all conveniently of the same, relatively inexpensive type.

What is claimed is:

1. In a color television receiver including a source of chrominance signals comprising modulated color subcarrier waves, and a source of reference oscillations of nominal subcarrier frequency, a color demodulator comprising, in combination:

an electron discharge device having cathode, control grid, screen grid, suppressor grid and anode electrodes, said suppressor grid being maintained at the potential of said cathode, and said screen grid having a maximum screen grid potential rating of a given magnitude;

means for establishing periodic intervals of conduction in said device including means for applying oscillations from said reference oscillation source between said control grid and cathode electrodes and bias establishing means responsive to said applied oscillations for biasing said device to cut-off for periods intervening recurring peaks of a given polarity of said applied oscillations;

means for supplying said screen grid electrode with a unidirectional operating potential of a magnitude appreciably smaller than said given magnitude;

means for varying the magnitude of current drawn by said anode electrode during said periodic conduction intervals in accordance with said modulated color subcarrier waves, said anode current varying means comprising means for applying said chrominance signals to said screen grid electrode;

and means for deriving a demodulated signal output from said anode current variations.

2. In a color television receiver including a chrominance signal amplifier and a color oscillator having first and second outputs of respectively different phases, color demodulation apparatus comprising the combination of:

a pair of electron tubes, each of said tubes having at least a pentode section including cathode, control grid, screen grid, suppressor grid and anode electrodes, said suppressor grid being maintained at the potential of said cathode and said screen grid having a maximum screen grid potential rating of a given magnitude;

means for applying said first output of said color oscillator between said control grid and said cathode of one of said pair of electron tubes, said means including a first self-biasing network;

means for applying said second output of said color oscillator between said control grid and said cathode of the other of said pair of electron tubes, said means including a second self-biasing network;

means for supplying the screen grid electrode of each of said pair of electron tubes with a unidirectional operating potential of a magnitude that is small compared to said given magnitude;

means for applying the output of said chrominance signal amplifier in common to the screen grid electrodes of both of said pair of electron tubes;

and respective means coupled to said anode electrode of each of said pair of electron tubes for deriving respectively different demodulated signal outputs.

3. In a color television receiver including a chrominance signal amplifier, and a color oscillator having first and second outputs of respectively different phases, apparatus comprising the combination of:

a pair of electron tubes, each of said tubes having a triode section and a pentode section, said pentode section including cathode, control grid, screen grid, suppressor grid and anode electrodes, said suppressor grid being maintained at the potential of said cathode and said screen grid having a maximum screen grid potential rating of a given magnitude;

means for applying said first output of said color oscillator between said control grid and said cathode of one of said pair of electron tubes, said means including a first self-biasing network;

means for applying said second output of said color oscillator between said control grid and said cathode of the other of said pair of electron tubes, said means including a second self-biasing network;

means for supplying the screen grid electrode of each of said pair of electron tubes with a unidirectional operating potential of a magnitude that is small compared to said given magnitude;

means for applying the output of said chrominance signal amplifier in common to the screen grid electrodes of both of said pair of electron tubes;

means coupled to said anode electrode of said one of said pair of electron tubes for deriving a first demodulated signal output;

means coupled to said anode electrode of said other of said pair of electron tubes for deriving a second demodulated signal output;

and means for matrixing said first and second demodulating signal outputs to develop a predetermined combination thereof, said matrixing means including the triode sections of said pair of electron tubes.

4. In a color television receiver including a chrominance signal amplifier, and a color oscillator having first and second outputs of respectively different phases, apparatus comprising the combination of:

a pair of electron tubes, each of said tubes having a triode section and a pentode section, said pentode section including cathode, control grid, screen grid, suppressor grid and anode electrodes, said suppressor grid being maintained at the potential of said cathode and said screen grid having a maximum screen grid potential rating of a given magnitude;

means for applying said first output of said color oscillator between said control grid and said cathode of one of said pair of electron tubes, said means including a first self-biasing network;

means for applying said second output of said color oscillator between said control grid and said cathode of the other of said pair of electron tubes, said means including a second self-biasing network;

means for supplying the screen grid electrode of each of said pair of electron tubes with a unidirectional operating potential of a magnitude that is small compared to said given magnitude;

means for applying the output of said chrominance signal amplifier in common to the screen grid electrodes of both of said pair of electron tubes;

means coupled to said anode electrode of said one of said pair of electron tubes for deriving a first demodulated signal output;

means coupled to said anode electrode of said other of said pair of electron tubes for deriving a second demodulated signal output;

a third electron tube having a triode section and a pentode section, said chrominance amplifier utilizing the pentode section of said third electron tube;

and means for matrixing said first and second demodulating signal outputs to develop a plurality of respectively different combinations thereof, said matrixing means including the triode sections of said three electron tubes.

References Cited

UNITED STATES PATENTS

| | | | |
|---|---|---|---|
| 2,250,708 | 6/1941 | Herz | 329—50 X |
| 2,824,172 | 2/1958 | Cherry | 178—5.2 X |

OTHER REFERENCES

Pritchard et al.: Color Television Signal Receiver Demodulators, R.C.A. Review, vol. 14, No. 2, June 1953, TK6540.R122, pp. 215–222.

JOHN W. CALDWELL, *Acting Primary Examiner.*

J. A. O'BRIEN. *Assistant Examiner.*